United States Patent
Lee et al.

(10) Patent No.: US 12,554,633 B2
(45) Date of Patent: Feb. 17, 2026

(54) NON-TARGET ON-DIE TERMINATION

(71) Applicant: Sandisk Technologies, Inc., Milpitas, CA (US)

(72) Inventors: Jang Woo Lee, San Ramon, CA (US); Siddhesh Darne, Milpitas, CA (US); Venkatesh Ramachandra, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 194 days.

(21) Appl. No.: 18/425,832

(22) Filed: Jan. 29, 2024

(65) Prior Publication Data

US 2025/0245145 A1     Jul. 31, 2025

(51) Int. Cl.
*G06F 12/02*     (2006.01)

(52) U.S. Cl.
CPC ................ *G06F 12/0246* (2013.01)

(58) Field of Classification Search
CPC ........... G06F 13/4086; G06F 2205/123; G11C 7/1045; G11C 7/22; G11C 7/24; G11C 8/18
See application file for complete search history.

(56) References Cited

U.S. PATENT DOCUMENTS

| | | |
|---|---|---|
| 7,911,857 B1 | 3/2011 | Venkataraman et al. |
| 9,654,105 B2 | 5/2017 | Kim |
| 10,171,078 B2 | 1/2019 | Kim et al. |
| 10,354,701 B2 | 7/2019 | Mazumder |
| 10,452,588 B2 | 10/2019 | Ito et al. |
| 10,566,038 B2* | 2/2020 | Son ............. H03H 7/38 |
| 10,916,279 B2* | 2/2021 | Son ............. H03H 7/38 |
| 11,211,102 B2* | 12/2021 | Moon .......... G11C 7/1084 |
| 11,295,794 B2 | 4/2022 | Itagaki |
| 11,750,190 B2* | 9/2023 | Hiemstra ....... H03K 19/018585 |
| | | 326/30 |
| 2008/0030221 A1* | 2/2008 | Lee .......... H04L 25/0278 |
| | | 326/30 |
| 2016/0087630 A1* | 3/2016 | Park ......... H03K 19/0005 |
| | | 326/30 |
| 2017/0288634 A1* | 10/2017 | Kang ......... G11C 16/08 |
| 2018/0329850 A1* | 11/2018 | Lim ........... G06F 3/0614 |
| 2018/0342274 A1* | 11/2018 | Son ........... H03H 7/38 |
| 2021/0174861 A1* | 6/2021 | Kim .......... G11C 11/4096 |
| 2023/0090800 A1 | 3/2023 | Kimura |
| 2023/0342050 A1* | 10/2023 | Um .......... G11C 7/1084 |
| 2025/0245145 A1* | 7/2025 | Lee .......... G06F 12/0246 |

* cited by examiner

*Primary Examiner* — Jason M Crawford
(74) *Attorney, Agent, or Firm* — Pearl Cohen Zedek Latzer Baratz LLP

(57) ABSTRACT

Technology for a memory system having on-die termination (ODT) in a non-target memory die. A read enable path of a first die and a data strobe path of a second die are connected to a first electrical line. However, a data strobe path of the second die and a read enable path of the first die are connected to a second electrical line. Each die contains detection circuit that detects a condition of line that carries a read enable signal when that die is a non-target. The die enables ODT to provide termination resistance for the electrical line that carries the read enable signal when that die is the non-target.

20 Claims, 15 Drawing Sheets

NON-TARGET ON-DIE TERMINATION

BACKGROUND

The present disclosure relates to non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery).

A typical memory system contains a memory controller and a number of semiconductor dies ("memory dies") that contain memory cells that store data. The memory controller typically interfaces with a host device that sends read and write commands. The memory controller oversees the writing of the host data to the various memory dies, as well as reading back the host data. FIG. 1A depicts a conventional interface 10 between a memory controller 20 and a memory die 30. The memory system may have additional memory dies 30, but they are not depicted in FIG. 1A. The interface 10 has a number of signals that are transferred over a bus that connects the memory controller 20 with the memory die 30. The example signals include a chip enable signal CEn, an address latch enable signal ALE, a command latch enable signal CLE, a write enable signal WEn, a read enable signal REn/BREn, a data strobe signal DQS/BDQS, and an input/output signal DQ[n:0].

The signal CEn enables the memory die 30 and is asserted (or active) at a low level. The signal CLE is used to indicate that the I/O signals DQ[n:0] specify a command. The signal ALE is used to indicate that the I/O signals DQ[n:0] specify an address. The signal WEn is used to import the command or the address at transition timing from the low level to a high level. The signal REn is active low and is used to read from the memory die 30. The signal BREn is a complementary signal of the signal REn.

The input/output signal DQ[n:0] is, for example, an 8-bit signal. The input/output signal may have more or fewer than 8 bits. The input/output signal may contain a command, an address, data transmitted to the memory die 30 for a write, or data transmitted from the memory die 30 for a read, depending on the present usage.

The signal DQS and a complementary signal BDQS of the signal DQS are output from a transmitting side together with the I/O signal. During write the memory controller 20 transmits DQS/BDQS. During read the memory die 30 transmits DQS/BDQS. A data receiving side receives the transmitted signals DQS and BDQS. The signal DQS/BDQS may be referred to as a data strobe and is used by the receiving side to adjust timing with respect to the data being received on DQ[n:0].

Whereas FIG. 1A depicts one memory die 30 connected to the signal lines in the interface 10, more than one memory die could connect to the signal lines. FIG. 1B depicts a conventional memory system having two memory dies 30a, 30b connected to a PCB board 50. Each memory die 30a, 30b has a number of pads or the like to allow connections to the memory interface to the controller (controller not depicted in FIG. 1B). In this example, the pads are labeled P1, P2, P3, REn, DQS, P4, P5, and P6. There typically are many more pads. Because the lower die 30b is inverted relative to the upper die 30a, the sequence of pads is reversed on the lower die 30a relative to the upper die 30a. The locations of pads REn, DQS are just one example and vary in accordance to implementation The other pads P1-P6 may be used for other signal lines in the memory interface. The pads labeled DQS are each connected to the same electrical line in the memory interface. The pads labeled REn are each connected to the same electrical line in the memory interface. The electrical lines of the memory interface are not explicitly depicted in FIG. 1B. However, a first stub line 60 between the two DQS pads, and a second stub line 62 between the two REn pads are depicted. One drawback of this configuration is the relatively long stub lines 60, 62. Note that the signals over DQS may be high speed and that electrical interference is a significant issue. Therefore, relatively long stub lines 60, 62 can negatively impact signal integrity.

The memory die 30 typically contains on-die termination (ODT) in order to suppress signal reflection. The ODT includes a termination resistor with one end connected to a signal transmission line. The other end of the termination resistor is typically connected to a voltage source. The ODT need not be used at all times. Thus, the ODT may contain a switch or the like to connect/disconnect the termination resistor. FIG. 2A is a diagram that depicts one conventional technique for providing on-die termination resistance. The memory system depicted in FIG. 2A has a similar configuration as the example in FIG. 1B with two dies. Each die 30a, 30b has its respective REn pad connected to the same REn electrical line 240. Each die 30a, 30b has its respective DQS pad connected to the same DQS electrical line 242. FIG. 2A depicts an example in which memory die 30a is the target of a read command and memory die 30b is a non-target of the read command. For the sake of discussion, die 30a is referred to as the target die 30a and die 30b as referred to as the non-target die 30b. At a different point in time these roles may be reversed. The CEn signal may be used to control which die is the target and non-target. Arrow 218 depicts the direction of propagation of the REn signal. Receiver 206a in the target die 30a receives the REn signal. Each die has nRE ODT 210a, 210b. The target die 30a may activate nRE ODT 210a responsive to receiver 206a detecting a condition of the REn signal. Receiver 206b in the non-target die 30b is not presently active due to the non-target die 30b not being selected. The non-target die 30b may activate nRE ODT 210b responsive to buffer 214b detecting a condition of the REn signal. Arrow 220 depicts the direction of propagation of the DQS signal for this read command. During the read command, the DQS driver 208a in the target die 30a sends the DQS signal. During the read command, the DQS driver 208b in the non-target die 30a is not active. Die 30a has DQS ODT 212a, which may be used to terminate the DQS line 242 during the read command. Die 30b has DQS ODT 212b, which may be used to terminate the DQS line 242 during the read command. When the upper die 30a is a non-target it uses buffer 214a to detect a condition of the REn signal on the REn electrical line 240.

FIG. 2B is a diagram that depicts one conventional technique for providing on-die termination during a write command. The target die 30a and non-target die 30b of FIG. 2A are again depicted in FIG. 2B. However, a DQS receiver 228a, 228b are depicted on the respective dies instead of the DQS drivers 208a, 208b. Target die 30a is the target of a write command in FIG. 2B Arrow 222 depicts the direction of propagation of the DQS signal for the write command. Die 30a has DQS ODT 212a, which may be used to terminate the DQS line during the write command. Die 30b has DQS ODT 212b, which may be used to terminate the DQS line during the write command. The read enable signal REn is not needed for write. Therefore, the nRE ODT 210a, 210b are not required for the write.

BRIEF DESCRIPTION OF THE DRAWINGS

Like-numbered elements refer to common components in the different figures.

DETAILED DESCRIPTION

Technology is disclosed for a memory system that provides on-die termination (ODT) in a non-target memory die. An embodiment of the memory system has two memory dies (first die, second die) each connected to a memory interface to a memory controller. During a memory operation, one die is a target die and the other is a non-target die. A "target memory die" is a memory die that has been selected, enabled, or otherwise chosen by a memory controller or the like for a memory operation. The memory operation involves communicating signals (e.g., command, address, data) over a communication link between memory controller and the target die. A "non-target memory die" is a memory die that is connected to the same communication link as the target memory die but has not been selected, enabled, or otherwise chosen for the memory operation.

The memory interface has a number of electrical lines to provide signals such as read enable, data strobe, etc. In an embodiment, a read enable (e.g., REn) path of the first die is connected to a first electrical line and a data strobe (e.g., DQS) path of the first die is connected to a second electrical line. However, a DQS path of the second die is connected to the first electrical line and an REn path of the second die is connected to the second electrical line. When the first memory die is a target die for a read command the first memory die receives a read enable signal on the first electrical line and sends a data strobe signal over the second electrical line. However, when the second memory die is a target die for a read command the second memory die receives a read enable signal on the second electrical line and sends a data strobe signal over the first electrical line. Each die contains detection circuit that detects a condition of line that carries a read enable signal when that die is a non-target. For example, the second die has a detection circuit that detects a falling of REn on the first electrical line when the first die is the target of a read command and the second die is a non-target. The second die activates ODT connected to the first electrical line in response to detecting the falling of REn on the first electrical line.

Figure 1A:
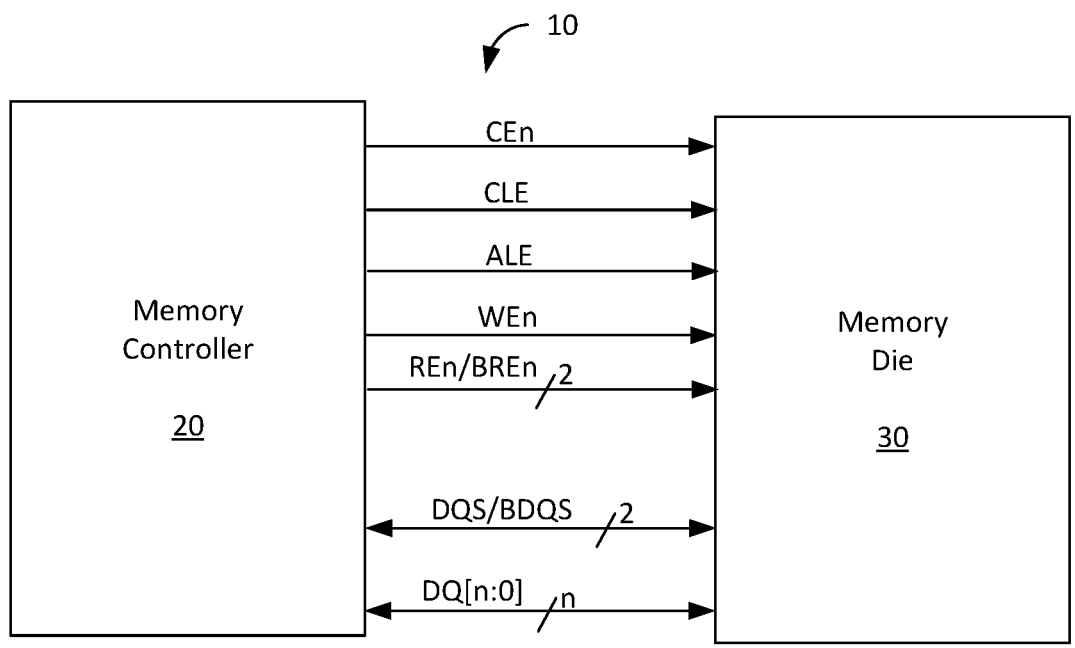
FIG. 1A depicts a conventional interface between a memory controller and a memory die.
Figure 1B:
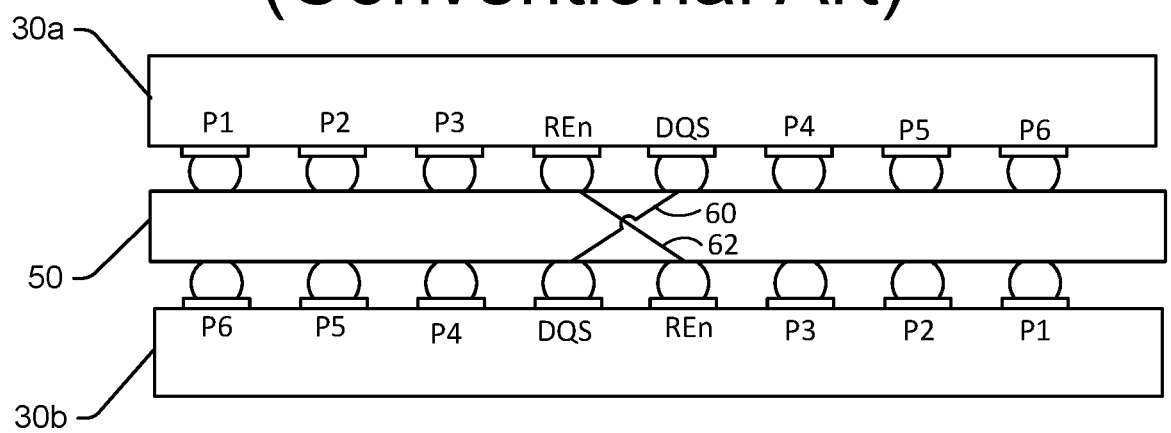
FIG. 1B depicts a conventional memory system having two memory dies connected to a PCB board.
Figure 2A:
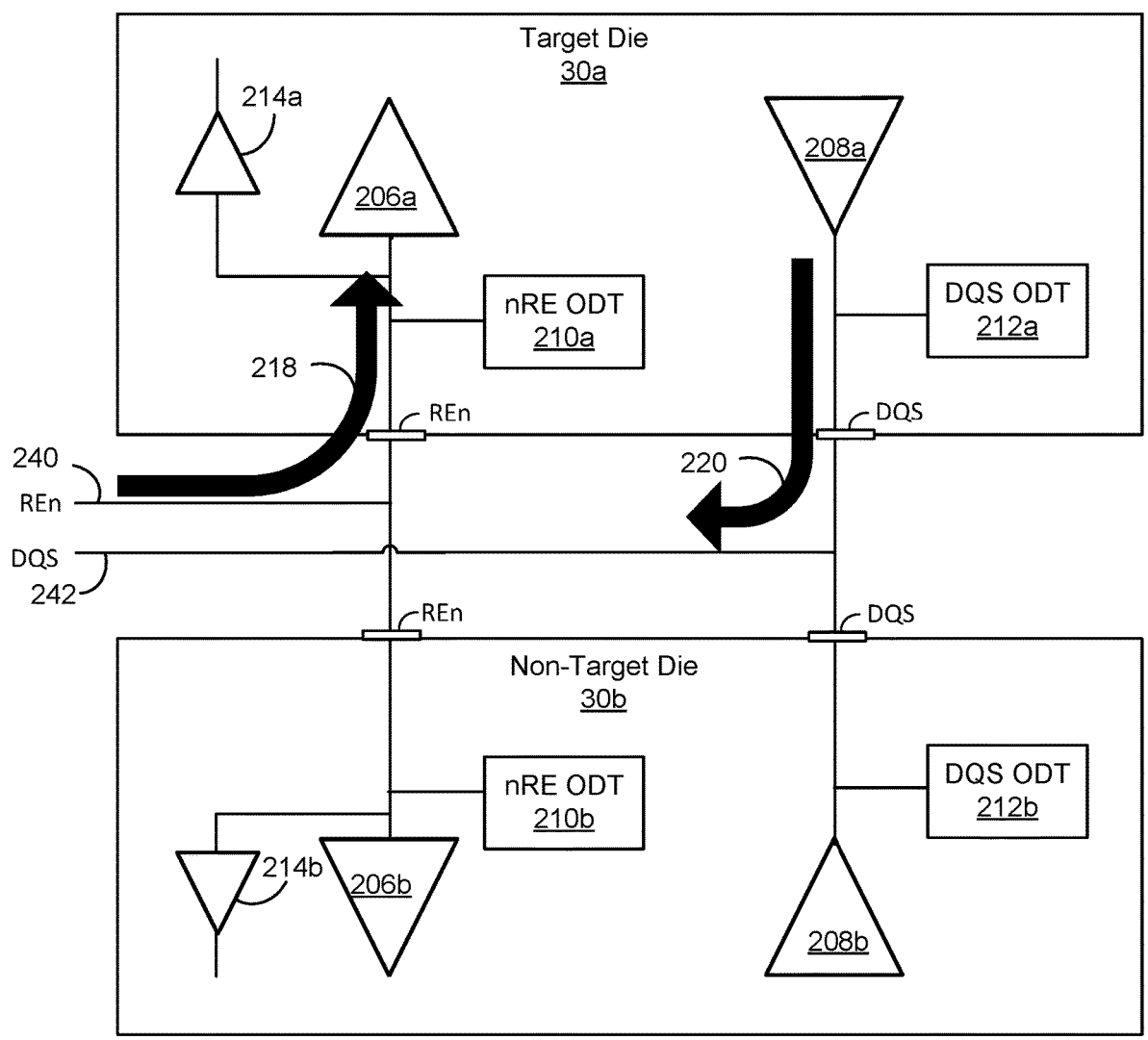
FIG. 2A is a diagram that depicts one conventional technique for providing on-die termination during read.
Figure 2B:
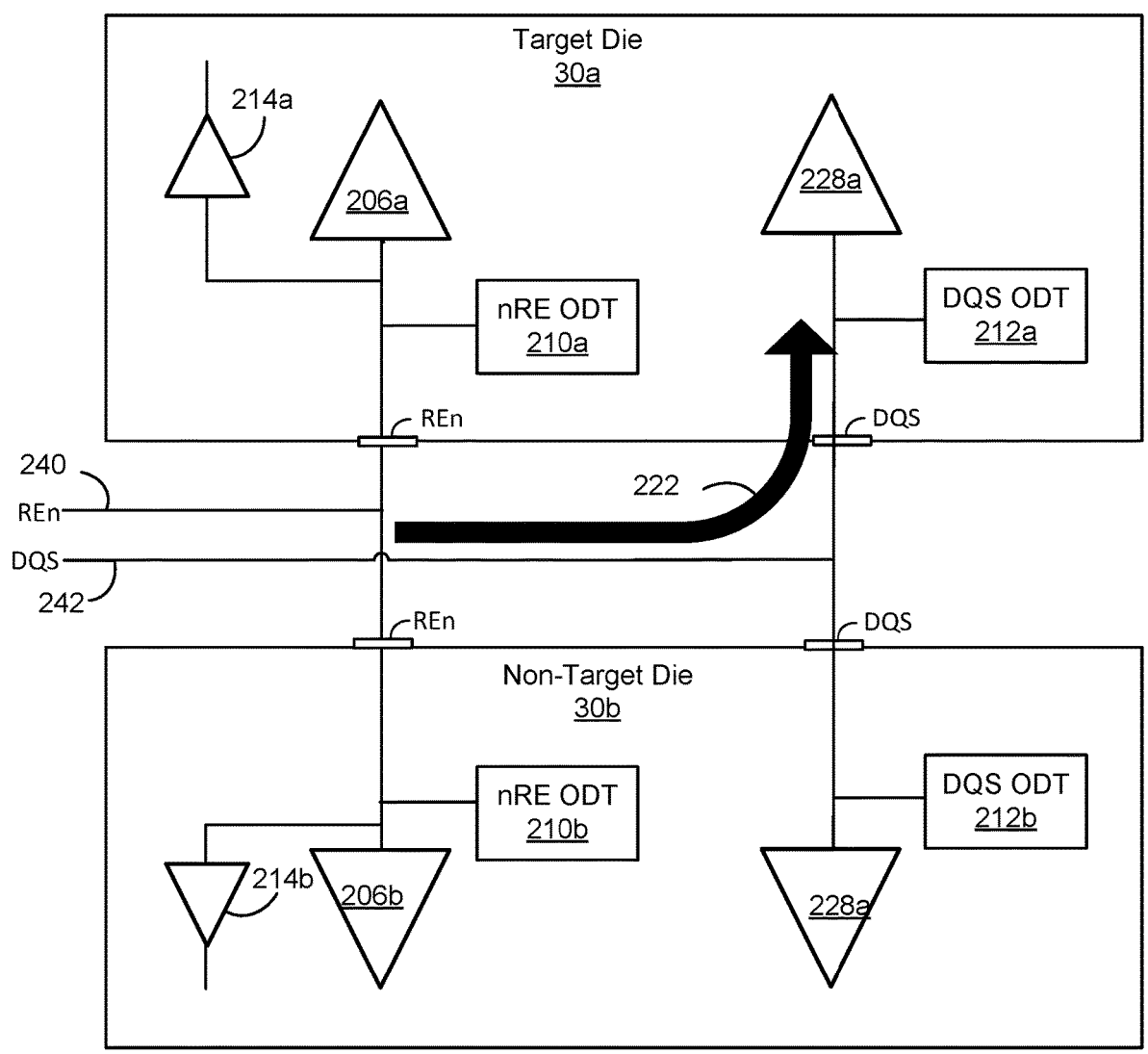
FIG. 2B is a diagram that depicts one conventional technique for providing on-die termination during a write command.
Figure 3A:
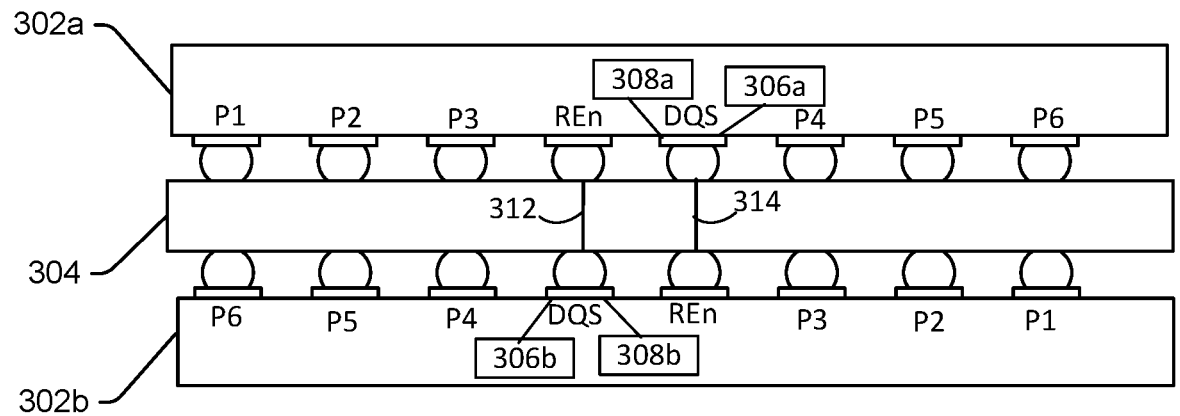
FIG. 3A is a diagram of one embodiment of a memory system having two memory dies.

FIG. 3A is a diagram of one embodiment of a memory system having two memory dies 302a, 304b. The two memory dies 302a, 302b are attached to the PCB 304. For ease of explanation, the pad configuration is similar to the pad configuration in the conventional example in FIG. 1B. However, in the configuration in FIG. 3A, the REn pad of memory die 302a and the DQS pad of memory die 302b are connected to the same electrical line of the memory interface. Analogously, the DQS pad of memory die 302a and the REn pad of memory die 302b are connected to the same electrical line of the memory interface. Note that here the term "electrical line" is referring to a particular physical line. As will be explained more fully below, it is possible to transfer different signals over a particular electrical line at different times. For example, at one point in time a particular electrical line may be used to transfer the REn signal and at a different point in time the particular electrical line may be used to transfer the DQS signal. The electrical lines of the memory interface are not explicitly depicted in FIG. 3A, but a stub line 312 between the REn pad of memory die 302a and the DQS pad of memory die 302b is depicted. Also a stub line 314 between the DQS pad of memory die 302a and the REn pad of memory die 302b is depicted. The stub lines 312, 314 in FIG. 3A are much shorter than the stub lines 60, 62 in FIG. 2. Therefore, signal transfer integrity is improved.

For ease of discussion, memory die 302a will be referred to as the upper memory die 302a and memory die 302b will be referred to as the lower memory die 302b. The memory controller may select one of the dies as a target for a memory operation with the other die being a referred to as a non-target. When the upper memory die 306a is the target the upper memory die 302a receives the REn signal on its REn pad. For a read command, the target upper memory die 306a sends a data strobe signal out its DQS pad. For a write command, the target upper memory die 306a receive a data strobe signal at its DQS pad. The lower memory die 302b operates in a similar manner. When the lower memory die 302b is the target the lower memory die 302b receives the REn signal on its REn pad. For a read command, the target lower memory die 302b transmits a data strobe signal out its DQS pad. For a write command, the target lower memory die 302b receives a data strobe signal at its DQS pad.

The upper memory die 302a has on-die termination (ODT) 306a connected to its DQS pad. The ODT 306a provides on-die termination resistance for an end of the electrical line of the memory interface that connects to the DQS pad of the upper memory die 302a. In an embodiment, the upper memory die 302a activates the ODT 306a to provide a termination resistance when the lower memory die 302*b* is the target and the upper memory die 302*a* is a non-target. Thus, the ODT 306*a* connected to the DQS pad of the upper memory die 302*a* may be used to provide termination when the electrical line connected to the DQS pad of the upper memory die 302*a* is being used for the REn signal (for the memory operation in the lower memory die 302*b*). The upper memory die 302*a* has a detection circuit 308*a* connected to its DQS pad. In an embodiment the detection circuit 308*a* is used to detect a condition of the REn signal (on the electrical line connected to the DQS pad of the upper memory die 302*a*) in order to determine that the ODT 306*a* should be activated. In an embodiment, the condition of the REn signal is a falling edge of the REn signal at a time when the upper memory die 302*a* is a non-target.

The lower memory die 302*b* has on-die termination (ODT) 306*b* connected to its DQS pad. The ODT 306*b* provides on-die termination for an end of the electrical line of the memory interface that connects to the DQS pad of the lower memory die 302*b*. Lower memory die 302*b* has detection circuit 308*b* connected to its DQS pad. In an embodiment, the detection circuit 308*b* is used to detect a condition of the REn signal (on the electrical line connected to the DQS pad of the lower memory die 302*b*) in order to determine that the ODT 306*b* should be activated. In an embodiment, the condition of the REn signal is a falling edge of the REn signal at a time when the lower memory die 302*b* is a non-target.

In an embodiment the detection circuit 308 includes an edge detection circuit ("edge detection circuit" may also be referred to as "edge detection logic"). The detection circuit 308 may contain, but is not limited to, a latch, a flip-flip, logic gates, and/or other logic gates or circuitry. In an embodiment, if detection circuit 308 detects a transition of the REn signal at an initial phase of the read command, then the detection circuit 308 will store, latch, or otherwise preserve a value that indicates that ODT is to be provided for the duration of the read command, regardless of additional transitions in the REn signal.

Figure 3B:
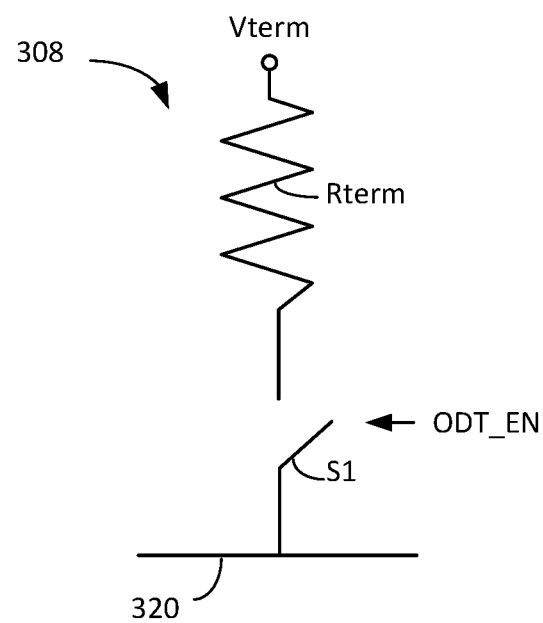
FIG. 3B depicts one embodiment of ODT.

FIG. 3B depicts one embodiment of ODT 306. The ODT 306 has a terminal resistor Rterm and a switch S1. The terminal resistor Rterm is connected to a termination voltage Vterm. The switch S1 is controllable by an on-die termination enable signal (ODT_EN). When the switch is closed the terminal resistor Rterm is connected in series between the electrical line 320 (of the memory interface) and termination voltage Vterm. The magnitudes of Rterm and Vterm are selected as suitable for the physical conditions. As is appreciated by those of ordinary skill in the art, a memory interface specification (e.g., the Open NAND Interface or ONFI Specification) may specify suitable values or ranges for Rterm and/or Vterm.

Figure 4A:
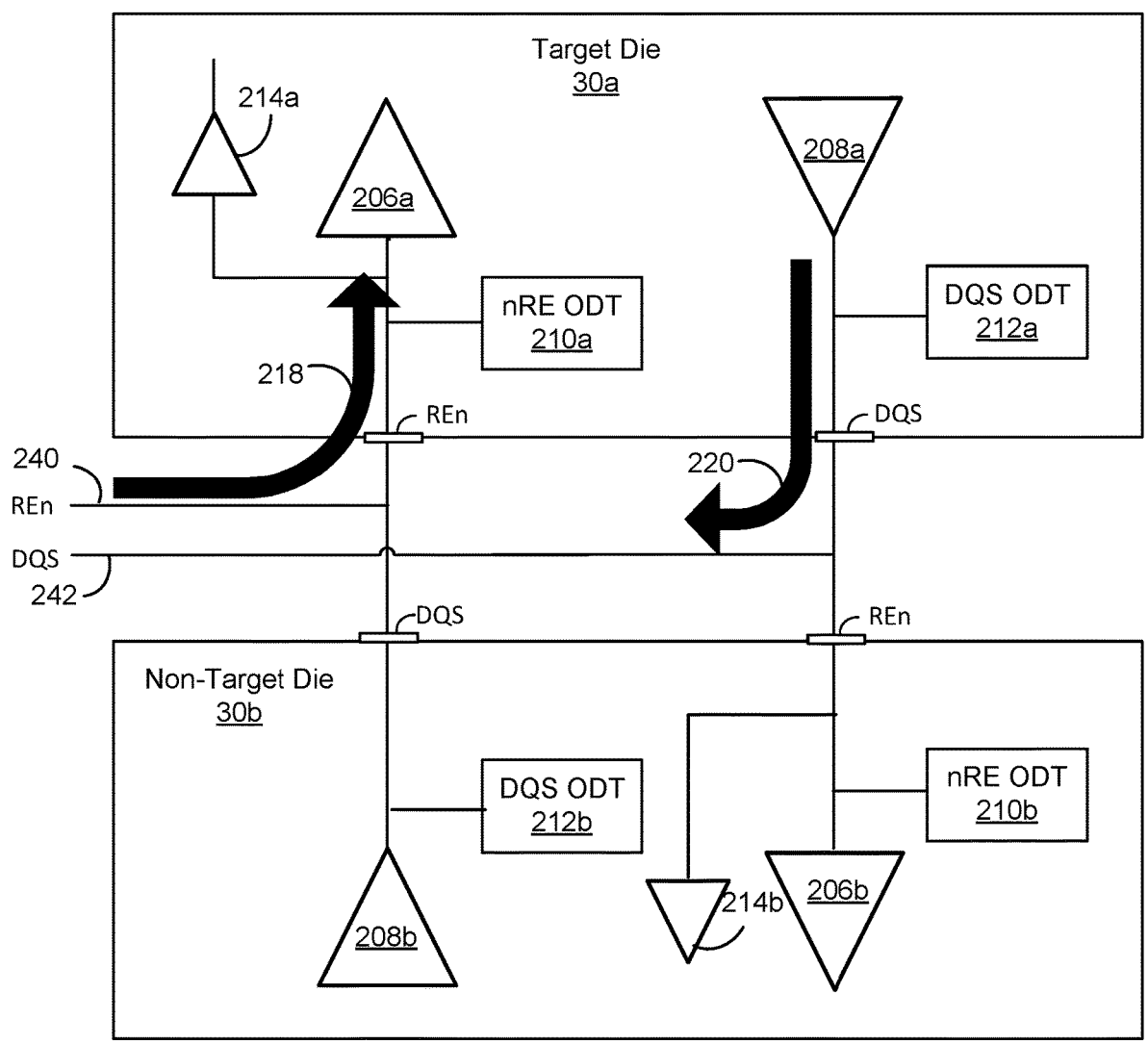
FIG. 4A depicts a problem if the conventional dies depicted in FIG. 2A were to be used for ODT for the non-target die during read.

FIG. 4A depicts a problem if the conventional dies depicted in FIG. 2A were to be used for ODT for the non-target die during a read command. FIG. 4A shows the same two dies 30*a*, 30*b* shown in FIG. 2A. However, the lower (non-target) die 30*b* has been reversed so that the connections between the REn pads and DQS pads are in the same configuration of FIG. 3A. Thus, the REn pad of the target die 30*a* and the DQS pad of the non-target die 30*b* each connect to the REn electrical line 240. Analogously, the DQS pad of the target die 30*a* and the REn pad of the non-target die 30*b* each connect to the DQS electrical line 242. Note that FIG. 4A depicts an example read command when the upper die is the target die and the lower die is the non-target die. The REn signal is depicted as being sent in the direction of arrow 218. Because the non-target die 30*b* has its DQS pad connected to the electrical line 240 on which REn propagates, the non-target die 30*b* is unable to detect the REn signal. For example, the non-target die 30*b* is unable to detect a transition in the REn signal at the initial phase of the read command. Therefore, the non-target die 30*b* is not able to provide ODT for the end of electrical line 240.

Figure 4B:
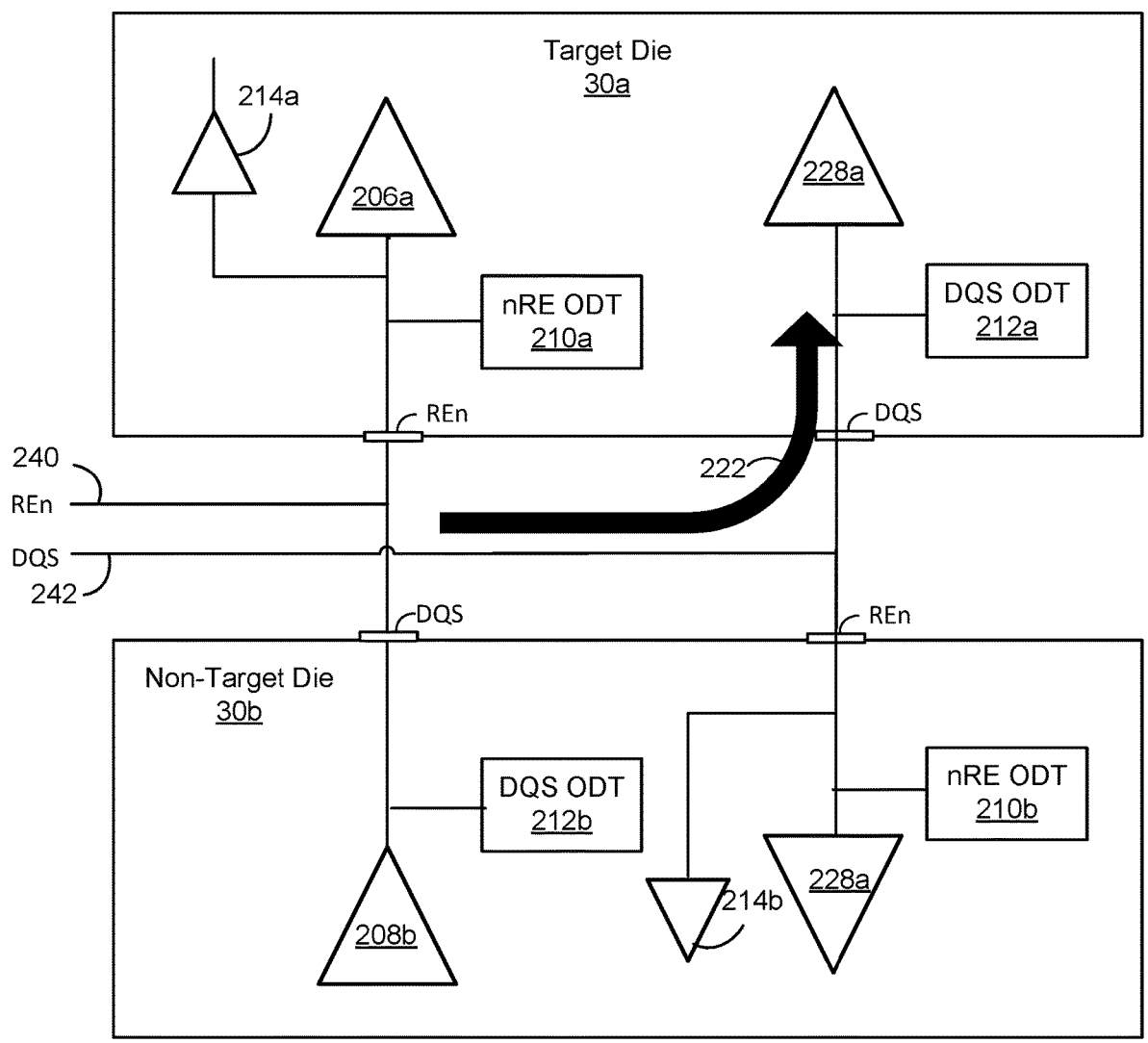
FIG. 4B depicts a problem if the conventional dies depicted in FIG. 2A were to be used for ODT for the non-target die during write.

FIG. 4B depicts a problem if the conventional dies depicted in FIG. 2B were to be used for ODT for the non-target die during a write command. FIG. 4B shows the same two dies 30*a*, 30*b* shown in FIG. 4A, but with the DQS drivers 208*a*, 208*b* being replaced with DQS receivers 228*a*, 228*b*. Arrow 222 depicts the direction of propagation of the DQS signal during write. The read enable signal (REn) does not transition during write and thus no arrow is depicted for REn. However, because the non-target die 30*b* has its DQS pad connected to the electrical line 240 on which REn would transition if this were a read command propagates, the non-target die 30*b* is unable to detect whether or not REn transitions.

Figure 5A:
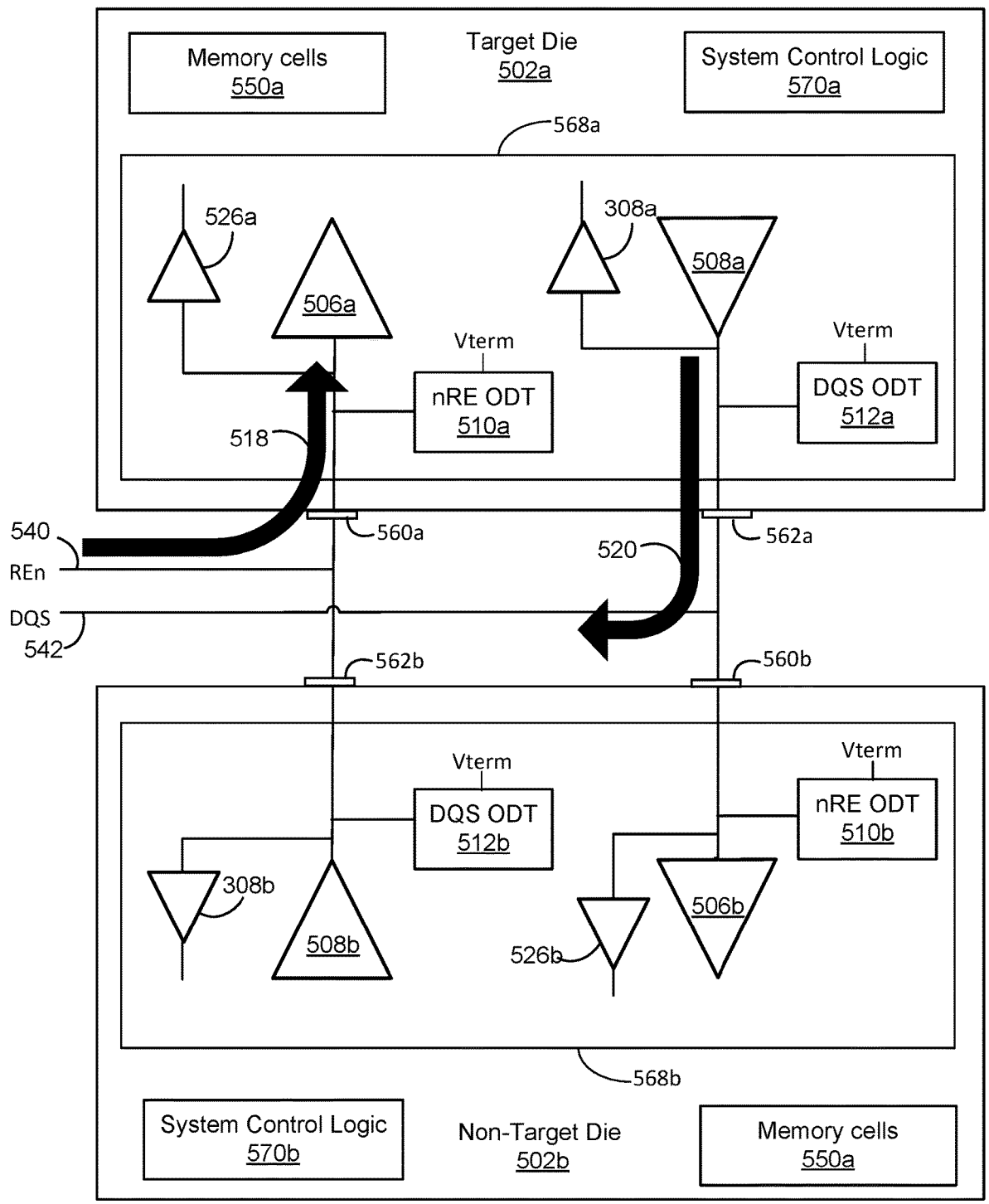
FIGS. 5A and 5B are diagram that depict one embodiment of a memory system that has on-die termination for a non-target die.

FIG. 5A is a diagram that depicts one embodiment of a memory system that has on-die termination for a non-target die during a read command. For the sake of discussion, the upper die 502*a* is referred to as the target die 502*a* and the lower die 502*b* as referred to as the non-target die 502*b*. At a different point in time these roles may be reversed. The CEn signal may be used to control which die is the target and non-target. The two dies 502*a*, 502*b* are in a configuration similar to that depicted in FIG. 3A. The target die 502*a* has an REn pad 560*a* connected to a first electrical line 540. The non-target die 502*b* has a DQS pad 562*b* connected to the first electrical line 540. The first electrical line 540 may be referred as a channel (or portion thereof), wherein REn pad 560*a* and DQS pad 562*b* are connected to the same channel. The target die 502*a* has a DQS pad 562*a* connected to a second electrical line 542. The non-target die 502*b* has an REn pad 560*b* connected to the second electrical line 542. The second electrical line 542 may be referred as a channel (or portion thereof), wherein the DQS pad 562*a* and the REn pad 560*b* are connected to the same channel. Memory die 502*a* has interface circuitry 568*a*, system control logic 570*a*, and memory cells 550*a*. Memory die 502*b* has interface circuitry 568*b*, system control logic 570*b*, and memory cells 550*b*. The alphabetical portion of reference label may be omitted when referred to element in general, without reference to a specific die. In an embodiment, the memory cells 550 are NAND cells. However, the memory cells 550 are not limited to NAND. The system control logic 570*b* controls operations on the die 502. The system control logic 570 reads and writes the memory cells 550. The system control logic 570 interfaces with the interface circuitry 568 to obtain data to write to the memory cells 550. The system control logic 570 provides data read from the memory cells 550 to the interface circuitry 568. The interface circuitry 568 is responsible for receiving signals (e.g., commands, data, data strobe, read enable etc.) over the memory interface from the memory controller. The interface circuitry 568 is responsible for providing signals (e.g., data, data strobe) over the memory interface to the memory controller. Only a small portion of the logic of the interface circuitry 568 is depicted in FIG. 5A.

The first interface circuitry 568*a* has an REn receiver 506*a* for receiving an REn signal on the first electrical line 540. The first interface circuitry 568*a* nRE ODT 510*a* connected to the REn pad 560*a* for on-die termination of the first electrical line 540. The first interface circuitry 568*a* has a DQS driver 508*a* for providing a DQS signal on the second electrical line 542. The first interface circuitry 568a has DQS ODT 512a connected to the DQS pad 562a for on-die termination of the second electrical line 542. FIG. 5A depicts an example in which the target die 502a is performing a read command. Arrow 518 shows the direction of propagation of the REn signal. Arrow 520 shows the direction of propagation of the DQS signal. Note that when the lower die (502b) is the target die the roles of the first electrical line 540 and the second electrical line 542 are reversed. That is, when the lower die (502b) is the target die the first electrical line 540 is used for the DQS signal and the second electrical line 542 is used for the REn signal. The second interface circuitry 568b has an REn receiver 506b for receiving an REn signal on the second electrical line 542 and nRE ODT 510b connected to the REn pad 560b for on-die termination of the second electrical line 542. The second interface circuitry 568b has a DQS driver 508b for providing a DQS signal on the first electrical line 540 and DQS ODT 512b connected to the DQS pad 562b for on-die termination of the first electrical line 540. Note that when a die is non-target die its REn receiver 506 and DQS driver 508 may be off. Note that when a die is a target die its REn receiver 506 and DQS driver 508 are on.

FIG. 5A depicts an example in which memory die 502a is the target of a read command and memory die 502b is a non-target. Arrow 518 depicts the direction of propagation of the REn signal. Receiver 506a in the target die 502a receives the REn signal. The target die 502a may activate nRE ODT 510a responsive to REn receiver 506a and or buffer 526a detecting a condition of the REn signal. Because the target die 502a is driving the DQS signal the target die 502a is not required to use DQS ODT 512a for the second electrical line 542. The non-target die 502b has DQS ODT 512b connected to the first electrical line 540. The non-target die 502b has REn detection circuit 308b connected to the first electrical line 540. REn detection circuit 308b is able to detect a condition of the REn signal in order to activate the DQS ODT 512b to thereby provide on-die termination resistance for the first electrical line 540. In one embodiment, the REn detection circuit 308b detects REn falling while the lower die 502b is the non-target die. In an embodiment, the non-target die 502b uses the nRE ODT 510b to provide on-die termination resistance for the second electrical line 542 when the upper die 502a is the target of the read command.

Figure 5B:
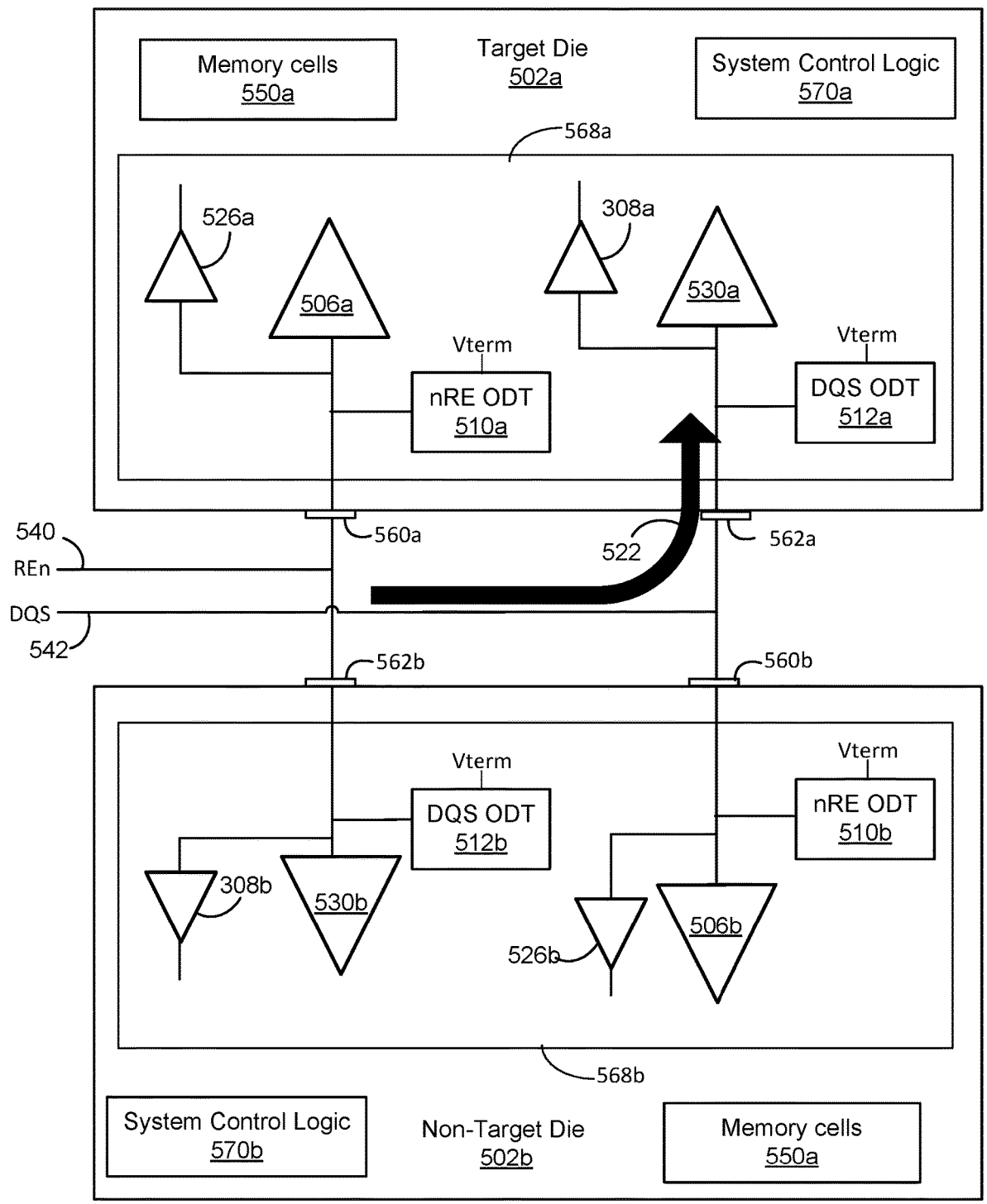

FIG. 5B depicts a similar configuration of two memory dies 502a, 502b, as depicted in FIG. 5A. However, FIG. 5B depicts an example in which memory die 502a is the target of a write command and memory die 502b is a non-target. FIG. 5B therefore depicts a DQS receiver 530a in the interface circuitry 568a of the target die 530a. For consistency, DQS receiver 530b is depicted in the interface circuitry 568b of the non-target die 502b, although the non-target die 502b does not use DQS receiver 530b when the upper die 502a is the target of the write command. Arrow 522 depicts the direction of propagation of the DQS signal. DQS receiver 530a is connected to the second electrical line 542 to receive the DQS signal. DQS receiver 530b is connected to the first electrical line 540 to receive a DQS signal from the memory controller when the lower die 502b is the target die of a write command. Thus, the roles of electrical lines 540, 542 are reversed when the lower die 502b is the target die of a write command (DQS on first electrical line 540, REn on second electrical line 542). Note that when a die is non-target die its DQS receiver 530 may be off. Note that when a die is a target die its DQS receiver 530 is on.

During the write command, the non-target die 502b uses the nRE ODT 510b to provide on-die termination resistance for the second electrical line 542. During the write command, the target die 502a uses the DQS ODT 512a to provide on-die termination resistance for the second electrical line 542. During the write command, the non-target die 502b is not required to provide on-die termination resistance for the first electrical line 540. In an embodiment, the non-target die 502b uses the detection circuit 308b to detect whether a condition on the first electrical line 540 occurs during the write command involving the target die 502a. For example, by detecting that the condition (e.g., transition of REn) does not occur during the write command, the non-target die 502b does not activate the DQS ODT 512b. In an embodiment, the non-target die 502b does not activate the DQS ODT 512b during the write command involving the target die 502a. Recall that the non-target die 502b does activate the DQS ODT 512b during the read command involving the target die 502a.

In an embodiment, when the lower die 502b is the non-target of a memory operation (e.g., read or write) detection logic 308b is on; however, detection logic 308a is off, buffer 526a is off, and buffer 526b is off. In an embodiment, when the upper die 502a is the non-target of a memory operation (e.g., read or write) detection logic 308a is on; however, detection logic 308b is off, buffer 526a is off, and buffer 526b is off.

Figure 6A:
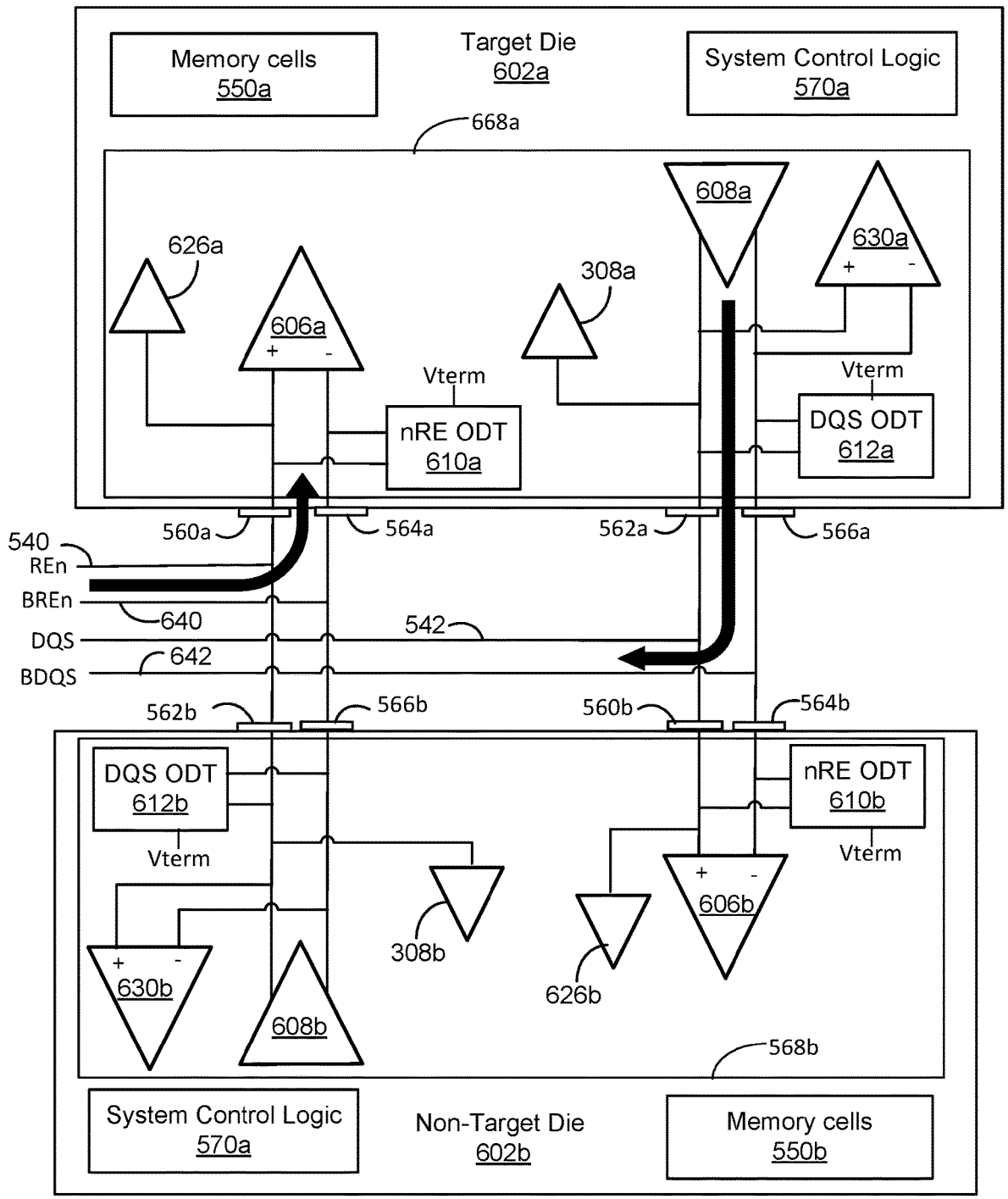
FIG. 6A is diagram that depicts one embodiment of a memory system that has on-die termination for a non-target die with differential signaling during read.

Referring back to FIG. 1A, the read enable signal may have a REn and a complement BREn. Also, the data strobe signal may include DQS and a complement BQDS. Each memory die may have a BREn pad and a BDQS pad. Referring back to FIGS. 3A, 5A, and 5B, analogous to how the DQS pad of one die and the REn pad of the other die are connected to the same electrical line, the BDQS pad of one die and the BREn pad of the other die may be connected to the same electrical line. FIG. 6A depicts an embodiment in which there is a third electrical line 640 and a fourth electrical line 642 in the memory interface between the dies 602a, 602b and the memory controller (controller not depicted in FIG. 6A). The upper die 602a has a BREn pad 564a connected to the third electrical line 640 and a BDQS pad 566a connected to the fourth electrical line 642. The lower die 602b has a BDQS pad 566b connected to the third electrical line 640 and a BREn pad 564b connected to the fourth electrical line 642. The first electrical line 540 and the third electrical line 640 are referred to herein as a differential channel. The second electrical line 542 and the fourth electrical line 642 are referred to herein as a differential channel.

The interface circuitry 668a of the target die 602a contains a differential REn receiver 606a, a differential DQS receiver 630a, and differential DQS driver 608a. The nRE ODT 610a provides on-die termination resistance for both the first electrical line 540 and the third electrical line 640. The DQS ODT 612a provides on-die termination resistance for both the second electrical line 542 and the fourth electrical line 642. The interface circuitry 668b of the non-target die 602b contains a differential REn receiver 606b, a differential DQS receiver 630b, and differential DQS driver 608b. The DQS ODT 612b provides on-die termination resistance for both the first electrical line 540 and the third electrical line 640. The nRE ODT 610b provides on-die termination resistance for both the second electrical line 542 and the fourth electrical line 642. Detection circuit 308a is connected to the second electrical line 542 and detection circuit 308b is connected to the first electrical line 540. Operation of the detection circuit 308 is similar that that described in connection with FIG. 5A. For example, detection circuit 308b on the non-target die 502b detects whether there is a falling transition of the REn signal on the first electrical line 540. In an alternative embodiment, detection circuit 308b is connected to the third electrical line 640 to detect whether there is a rising transition of the BREn signal on the third electrical line 640. The REn signal is active low. In an embodiment, the detection circuit 308b looks for a high to low transition of REn at an initial phase of a memory operation. The BREn signal is active high. In an embodiment, the detection circuit 308b looks for a low to high transition of BREn at an initial phase of a memory operation. Operation of the upper die 602a is similar when the upper die is a non-target die. The active low of REn and the active high of BREn are two examples of active states.

Figure 6B:
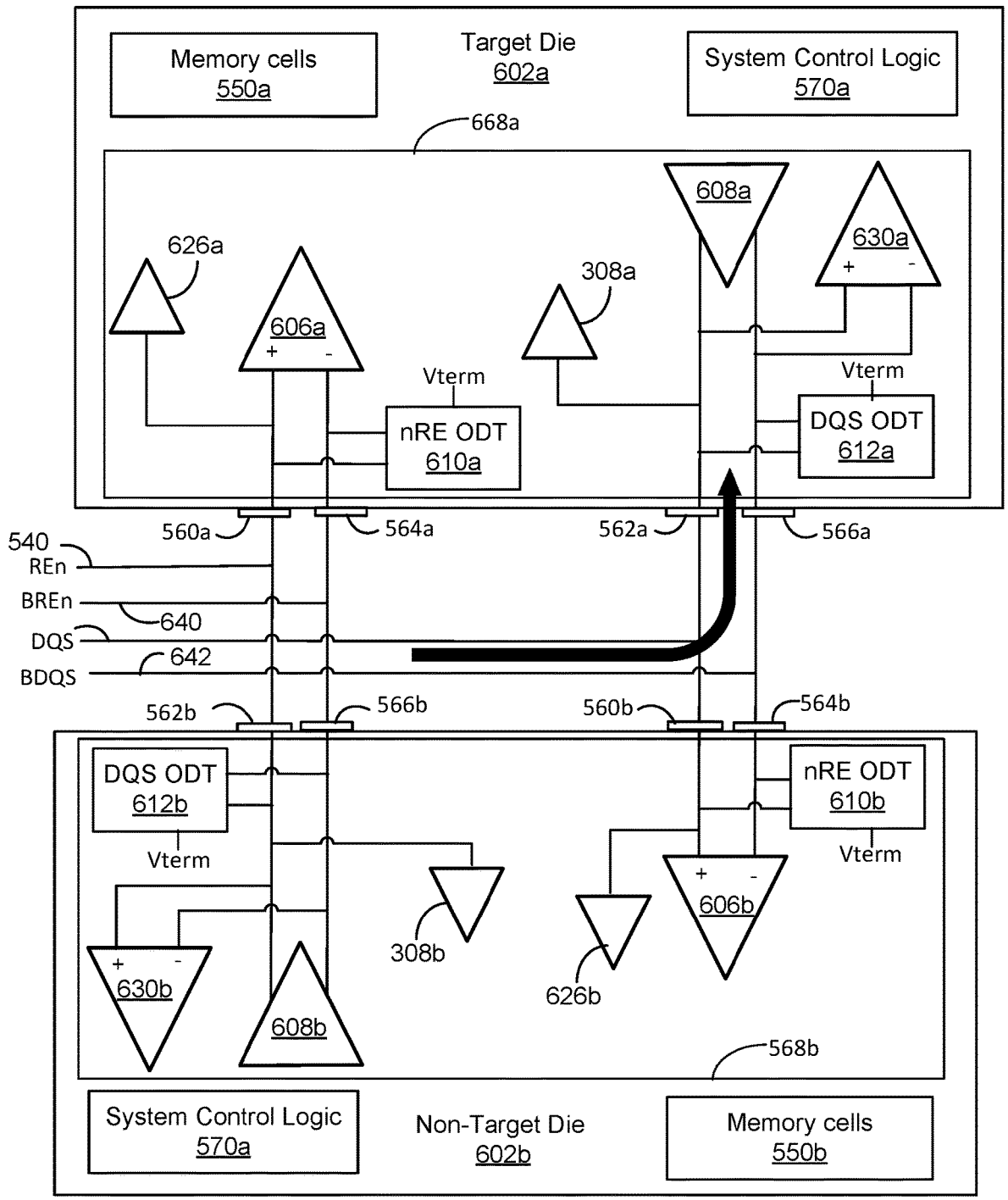
FIG. 6B is diagram that depicts one embodiment of a memory system that has on-die termination for a non-target die with differential signaling during write.

FIG. 6B depicts an embodiment in which there is REn, BREn, DQS, and BDQS during a write command. Operation is similar to the example read command discussed in connection with FIG. 6A. For example, detection circuit 308b on the non-target die 502b detects whether there is a falling transition of the REn signal on the first electrical line 540 during the write command. In an alternative embodiment, detection circuit 308b is connected to the third electrical line 640 to detect whether there is a rising transition of the BREn signal on the third electrical line 640 during the write command. In an embodiment, the detection circuit 308b looks for a high to low transition of REn at an initial phase of the write command. In an embodiment, the detection circuit 308b looks for a low to high transition of BREn at an initial phase of the write command. Since there will not be a transition of either REn or BREn during an embodiment of a write command, the non-target die 602b does not activate the DQS ODT 612b. Operation of the upper die 602a is similar when the upper die is a non-target die.

Figure 7A:
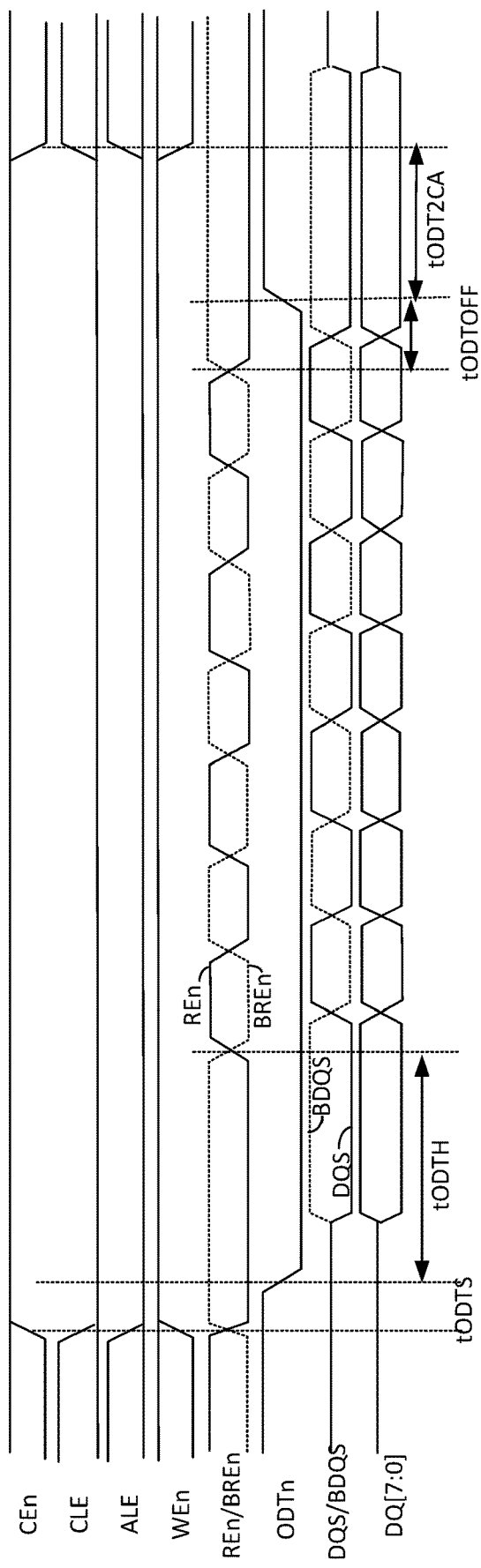
FIG. 7A is an example timing diagram for a read command.

FIG. 7A is an example timing diagram for a read command. The timing diagram shows that at the initial phase of the read command CEn goes high for the non-target die. CLE and ALE go low at the initial phase of the read command. WEn goes high the initial phase of the read command. The read enable signal has REn and the complement of REn (BREn). At the initial phase of the read command REn transitions from high to low. At the initial phase of the read command BREn transitions from low to high. The signal ODTn is a signal from the memory controller that instructs the memory dies that ODT is to be used for this memory operation. ODTn is active low, such that a low value instructs the memory dies that ODT is to be used. The time tODTS is a setup time for the ODTn signal. The time tODTSH is a hold time for the REn/BERn signal. During read, DQS/BDQS and DQ are provided by the memory die. The time tODTOFF is a setup time for disabling ODT. The rising edge of ODTn indicates that ODt is to be disabled. The time tODT2CA is the time period for turning off ODT.

Figure 7B:
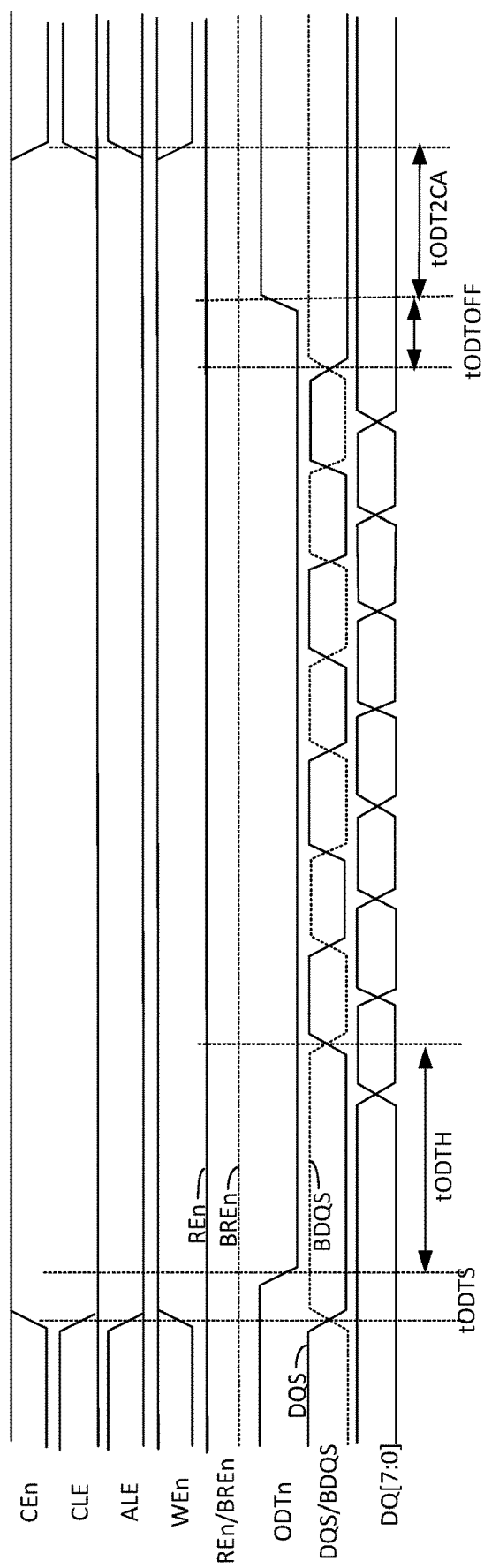
FIG. 7B is an example timing diagram for a write command.

FIG. 7B is an example timing diagram for a write command. During write, DQS/BDQS and DQ are provided by the memory controller. During write, the read enable signal (REn/BREn) does not transition. Therefore, by examining the read enable signal the non-target die is able to determine that this is a write and does not activate ODT for the electrical line(s) that provides read enable signal (REn/BREn). Note that the non-target die may look for a high to low transition of REn at the initial phase of the write command. Alternatively, the non-target die may look for a low to high transition of BREn at the initial phase of the write command.

The timings of REn/BREn, DQS/BDQS, and DQ in FIGS. 7A and 7B are consistent with a Toggle Mode, such as, for example, an ONFI Toggle Mode. However, embodiments of non-target die ODT are not limited to a Toggle Mode or to ONFI.

Figure 8:
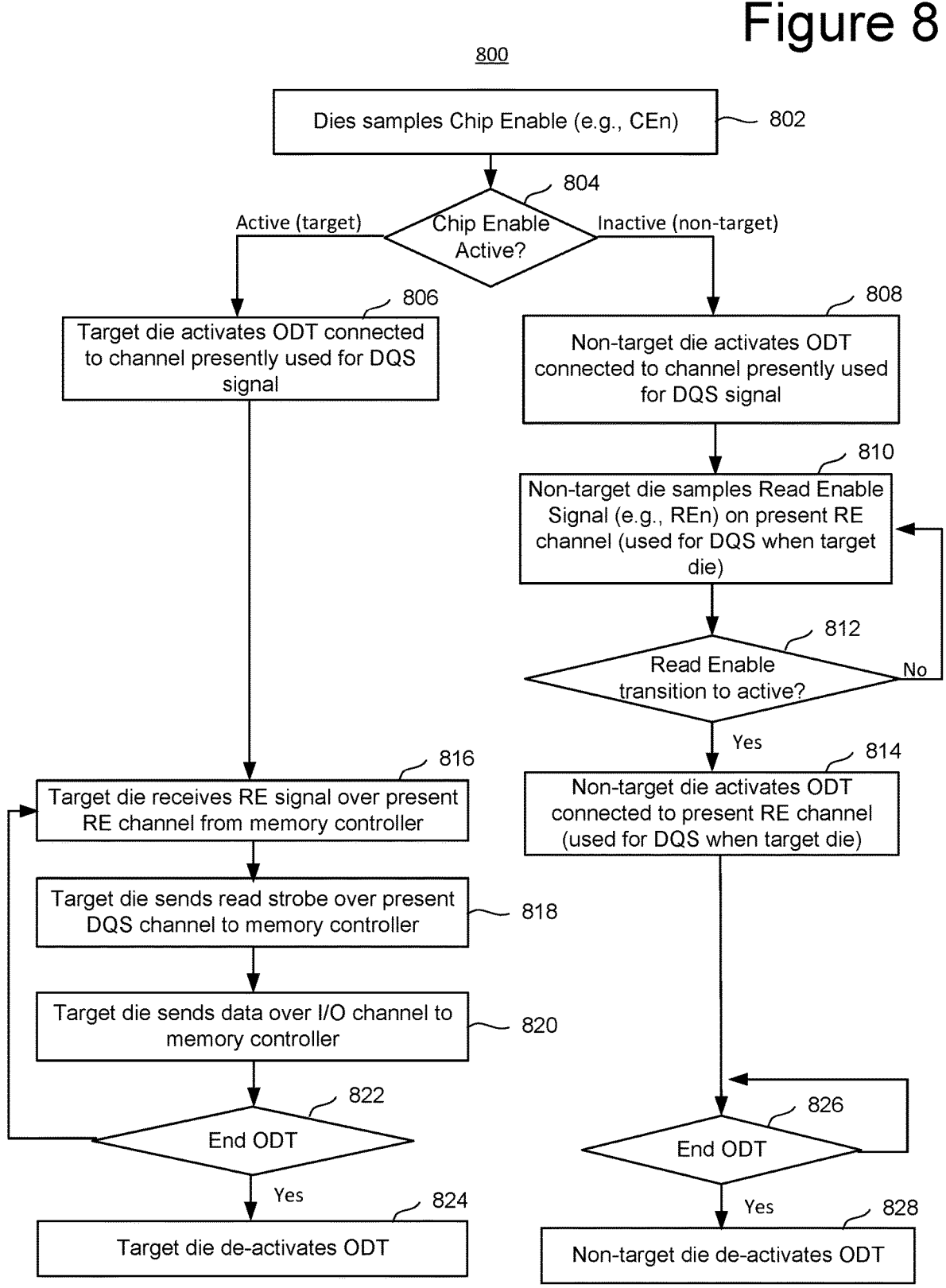
FIG. 8 is a flowchart of one embodiment of a process of providing ODT in a non-target die.

FIG. 8 is a flowchart of one embodiment of a process 800 of providing ODT in a non-target die. The process 800 pertains to an example in which a read is performed in a target memory die. Reference will be made to FIG. 5A for purpose of illustration, but process 800 is not limited to the memory system of FIG. 5A. Step 802 includes the memory dies sampling a chip enable signal (e.g., CEn). Step 804 is a determination of whether the chip enable signal is active (indicating the die is a target). Steps 806, 816, 818, 820, 822, and 824 are performed by the target memory die. Steps 808, 810, 812, 814, 826, and 828 are performed by the non-target memory die. Step 806 includes the target die activating ODT connected to the channel presently used for the DQS signal. For example, target die 502a activates DQS ODT 512a. Step 808 includes the non-target die activating ODT connected to the channel presently used for the DQS signal. For example, non-target die 502b activates nRE ODT 510b. Note that this channel will be used for the REn signal when the non-target die 502b becomes the target die.

Step 810 includes the non-target die 502b sampling the read enable signal (e.g., REn) on the present REn channel. For example, the detection circuit 308b on the non-target die 502b samples the first electrical line 540 during the initial phase of the memory operation. Note that this first electrical line 540 will be used for the DQS signal when the non-target die 502b becomes the target die. Step 812 includes a determination of whether the read enable signal transitions to active. In one embodiment, step 812 includes a test of whether REn transitions from high to low. In one embodiment, step 812 includes a test of whether BREn transitions from low to high. Step 814 includes the non-target die 502b activating ODT connected to the present RE channel responsive to detecting a condition (e.g., transition) of the read enable signal. For example, the DQS ODT 512b connected to the first electrical line 540 is activated. As noted, the first electrical line 540 will be used for the DQS signal when the non-target die 502b becomes the target die. In an embodiment, the detection circuit 308b generates a value (e.g., high voltage, low voltage, logic 0, logic 1, etc.) that indicates that ODT is to be used. In an embodiment, the detection circuit 308b stores, latches, or otherwise preserves this value during the read command.

Step 816 includes the target die receiving the RE signal over the present RE channel from the memory controller. For example, the target die 502a receives REn over the first electrical line 540. Step 818 includes the target die sending a read strobe signal over the present DQS channel to the memory controller. For example, the DQS driver 508a on the target die 502a sends DQS over the second electrical line 542. Step 820 includes the target die sending data over the I/O channel to the memory controller. With reference to FIG. 7A timing of the various signals during read can be seen.

Step 822 includes the target die determining whether to end ODT. In an embodiment, ODT ends in response to a change in a signal sent from the memory controller. For example, the ODTn signal (see FIGS. 7A, 7B) may be used to instruct the dies to end ODT. The target die de-activates the ODT in step 824. Step 826 includes the non-target die determining whether to end ODT. In an embodiment, the non-target die responds to the ODTn signal to end ODT. The non-target die de-activates the ODT in step 828.

Figure 9:
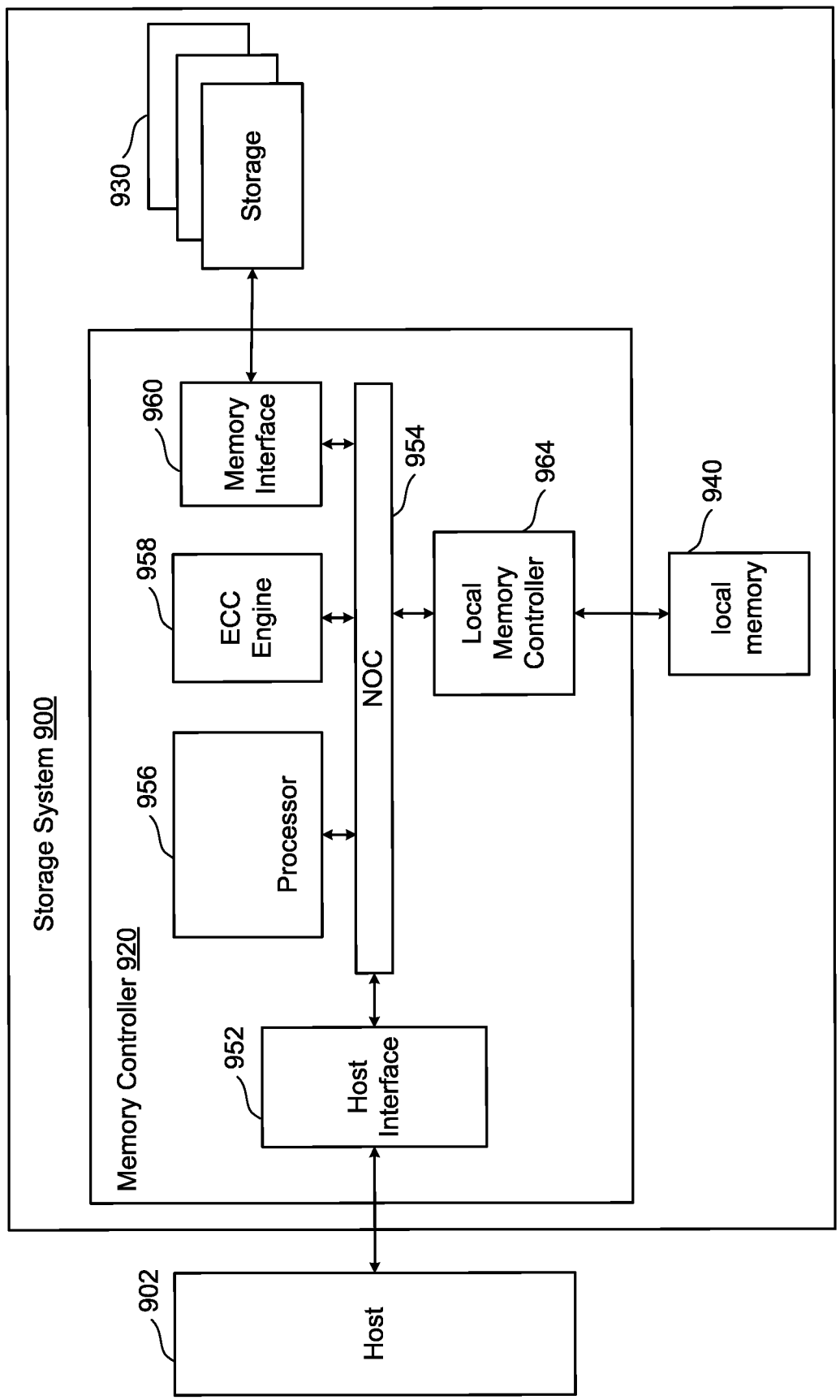
FIG. 9 is a block diagram depicting one embodiment of a storage system.

FIG. 9 is a block diagram of one embodiment of a storage system 900 that implements the technology described herein. In one embodiment, storage system 900 is a solid state drive ("SSD"). Storage system 900 can also be a memory card, USB drive or other type of storage system. The proposed technology is not limited to any one type of storage system. Storage system 900 is connected to host 902, which can be a computer, server, electronic device (e.g., smart phone, tablet or other mobile device), appliance, or another apparatus that uses memory and has data processing capabilities. In some embodiments, host 902 is separate from, but connected to, storage system 900. In other embodiments, storage system 900 is embedded within host 902.

The components of storage system 900 depicted in FIG. 9 are electrical circuits. Storage system 900 includes a memory controller 920 (or storage controller) connected to non-volatile storage 930 and local high speed memory 940 (e.g., DRAM, SRAM, MRAM). Local memory 940 is non-transitory memory, which may include volatile memory or non-volatile memory. Local high speed memory 940 is used by memory controller 920 to perform certain operations. For example, local high speed memory 940 may store logical to physical address translation tables ("L2P tables").

Memory controller 920 comprises a host interface 952 that is connected to and in communication with host 902. In one embodiment, host interface 952 implements an NVM Express (NVMe) over PCI Express (PCIe). Other interfaces can also be used, such as SCSI, SATA, etc. Host interface 952 is also connected to a network-on-chip (NOC) 954. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 954 can be replaced by a bus. Connected to and in communication with NOC 954 is processor 956, ECC engine 958, memory interface 960, and local memory controller 964. Local memory controller 964 is used to operate and communicate with local high speed memory 940 (e.g., DRAM, SRAM, MRAM).

ECC engine 958 performs error correction services. For example, ECC engine 958 performs data encoding and decoding. In one embodiment, ECC engine 958 is an electrical circuit programmed by software. For example, ECC engine 958 can be a processor that can be programmed. In other embodiments, ECC engine 958 is a custom and dedicated hardware circuit without any software. In another embodiment, the function of ECC engine 958 is implemented by processor 956.

Processor 956 performs the various controller memory operations, such as programming, erasing, reading, and memory management processes. In one embodiment, processor 956 is programmed by firmware. In other embodiments, processor 956 is a custom and dedicated hardware circuit without any software. Processor 956 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 920 (e.g., the translation module) performs address translation between the logical addresses used by the host and the physical addresses used by the memory die. One example implementation is to maintain tables (i.e. the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 940 cannot hold all of the L2P tables. In such a case, the entire set of L2P tables are stored in a storage 930 and a subset of the L2P tables are cached (L2P cache) in the local high speed memory 940.

Memory interface 960 communicates with non-volatile storage 930. In one embodiment, memory interface provides a Toggle Mode interface. Other interfaces can also be used. In some example implementations, memory interface 960 (or another portion of controller 920) implements a scheduler and buffer for transmitting data to and receiving data from one or more memory die.

Figure 10:
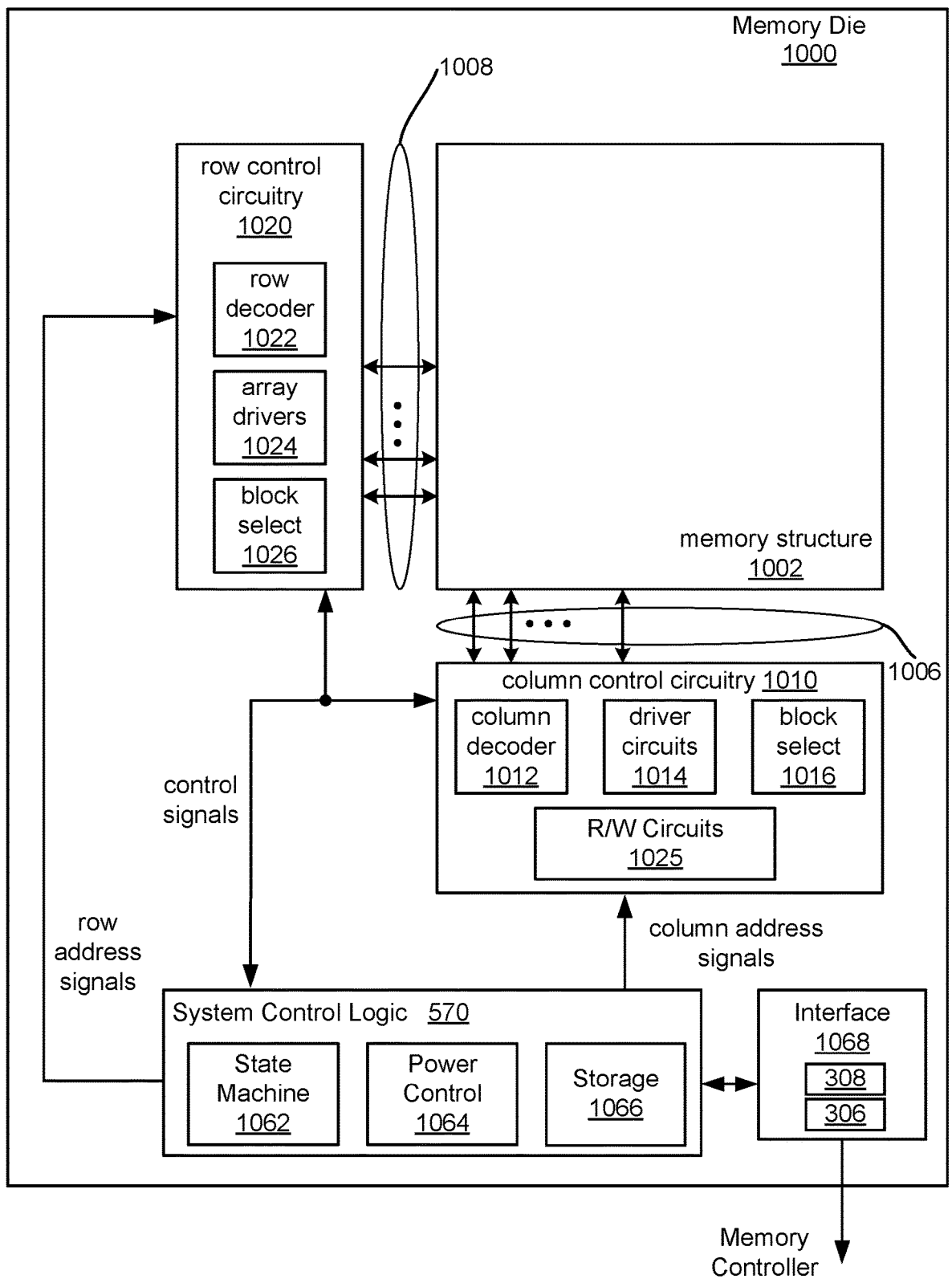
FIG. 10 is a block diagram of one embodiment of a memory die.

In one embodiment, non-volatile storage 930 comprises one or more memory dies. FIG. 10 is a functional block diagram of one embodiment of a memory die 1000 that comprises non-volatile storage 930. Each of the one or more memory dies of non-volatile storage 930 can be implemented as memory die 1000 of FIG. 10. The components depicted in FIG. 10 are electrical circuits. Memory die 1000 includes a memory structure 1002 (e.g., memory array) that can comprise non-volatile memory cells (also referred to as non-volatile storage cells), as described in more detail below. Memory structure 1002 may contain memory cells 550. The array terminal lines of memory structure 1002 include the various layer(s) of word lines organized as rows, and the various layer(s) of bit lines organized as columns. However, other orientations can also be implemented. Memory die 1000 includes row control circuitry 1020, whose outputs are connected to respective word lines of the memory structure 1002. Row control circuitry 1020 is coupled to memory structure 1002 through electrical paths 1008. Row control circuitry 1020 receives a group of M row address signals and one or more various control signals from System Control Logic circuit 570, and typically may include such circuits as row decoders 1022, array drivers 1024, and block select circuitry 1026 for both reading and writing (programming) operations. Row control circuitry 1020 may also include read/write circuitry. Memory die 1000 also includes column control circuitry 1010 including read/write circuits 1025. Column control circuitry 1010 is coupled to memory structure 1002 through electrical paths 1006. The read/write circuits 1025 may contain sense amplifiers and data latches. The sense amplifier(s) input/outputs are connected to respective bit lines of the memory structure 1002. Although only single block is shown for structure 1002, a memory die can include multiple arrays that can be individually accessed. Column control circuitry 1010 receives a group of N column address signals and one or more various control signals from System Control Logic 570, and typically may include such circuits as column decoders 1012, array terminal receivers or driver circuits 1014, block select circuitry 1016, as well as read/write circuitry, and I/O multiplexers. The system control logic 570, column control circuitry 1010, and/or row control circuity 1020 are configured to control memory operations such as open block reads at the die level.

System control logic 570 receives data and commands from memory controller 920 and provides output data and status to the host. In some embodiments, the system control logic 570 (which comprises one or more electrical circuits) includes state machine 1062 that provides die-level control of memory operations. In some embodiments, the state machine 1062 prevents over-erase of NAND strings in the memory structure 1002. State machine 1062 may control process 800 (see FIG. 8) to control on-die termination of electrical lines in a memory interface. In one embodiment, the state machine 1062 is programmable by software. In other embodiments, the state machine 1062 does not use software and is completely implemented in hardware (e.g., electrical circuits). In another embodiment, the state machine 1062 is replaced by a micro-controller or microprocessor, either on or off the memory chip. System control logic 570 can also include a power control module 1064 that controls the power and voltages supplied to the rows and columns of the memory structure 1002 during memory operations. System control logic 570 includes storage 1066 (e.g., RAM, registers, latches, etc.), which may be used to store parameters for operating the memory structure 1002.

Commands and data are transferred between memory controller 920 and memory die 1000 via memory controller interface 1068 (also referred to as a "communication interface"). Memory controller interface 1068 is an electrical interface for communicating with memory controller 920. Examples of memory controller interface 1068 include a Toggle Mode Interface and an Open NAND Flash Interface (ONFI). Other I/O interfaces can also be used. The memory interface 1068 may include, for example, interface 568 or 668. Thus, memory controller interface 1068 contains ODT 306 and detection circuit 308.

In some embodiments, all the elements of memory die 1000, including the system control logic 570, can be formed as part of a single die. In other embodiments, some or all of the system control logic 570 can be formed on a different die than the die that contains the memory structure 1002.

In one embodiment, memory structure 1002 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 1002 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 1002 is not limited to the examples above. Many different types of memory array architectures or memory technologies can be used to form memory structure 1002. No particular non-volatile memory technology is required for purposes of the new claimed embodiments proposed herein. Other examples of suitable technologies for memory cells of the memory structure 1002 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 1002 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or other wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

In view of the foregoing, an embodiment includes an apparatus comprising a communication link having a first channel and a second channel, a first memory die connected to the communication link, and a second memory die connected to the communication link. The first memory die is configured to send a first data strobe signal over the first channel and receive a first read enable signal on the second channel when the first memory die is a target die for a first read command. The second memory die has on-die termination (ODT) configured to provide termination resistance to the second channel. The second memory die is configured to send a second data strobe signal over the second channel and receive a second read enable signal on the first channel when the second memory die is a target of a second read command. The second memory die is configured to enable the second ODT responsive to a condition of the first read enable signal on the second channel when the first memory die is a target of the first read command and the second memory die is a non-target of the first read command.

In a further embodiment, the condition of the first read enable signal is a transition of the first read enable signal on the second channel during an initial phase of the first read command.

In a further embodiment, the first read enable signal is active low. The second memory die is configured to detect the first read enable signal transition from high to low as the condition to enable the second ODT.

In a further embodiment, the first read enable signal is active high. The second memory die is configured to detect the first read enable signal transition from low to high as the condition to enable the second ODT.

In a further embodiment, the first memory die includes first on-die termination (ODT) configured to provide termination resistance to the first channel. The ODT of the second die is second ODT. The first memory die is configured to enable the first ODT responsive to detection of a transition of the second read enable signal on the first channel during an initial phase of the second read command when the second memory die is a target of the second read command and the first memory die is a non-target of the second read command.

In a further embodiment, the first memory die further includes a first edge detection circuit coupled to the first channel. The first edge detection circuit is configured to detect an edge of the second read enable signal on the first channel during an initial phase of the second read command when the first memory die is a non-target of the second read command. The second memory die further includes a second edge detection circuit coupled to the second channel, the second edge detection circuit configured to detect an edge of the first read enable signal on the second channel during an initial phase of the first read command when the second memory die is a non-target of the first read command.

In a further embodiment, the first edge detection circuit comprises a first latch configured to detect an edge of the second read enable signal on the first channel. The second edge detection circuit comprises a second latch configured to detect an edge of the first read enable signal on the second channel.

In a further embodiment, the first channel comprises a first differential channel having a first electrical line and a second electrical line. The first edge detection circuit has a first input coupled to the first electrical line of the first channel to sample the second read enable signal when the first memory die is the non-target of the second read command. The second channel comprises a second differential channel having a third electrical line and a fourth electrical line. The second edge detection circuit has a first input coupled to the third electrical line of the second channel to sample the first read enable signal when the second memory die is the non-target of the first read command.

In a further embodiment, the second memory die is configured to disable the second ODT responsive to a condition of a read enable signal on the second channel when the first memory die is a target of a write command and the second memory die is a non-target of the write command.

In a further embodiment, the apparatus further comprises a memory controller communicatively coupled with the first memory die and the second memory die by the communication link. The memory controller is configured to select the first memory die as the target for the first read command while not selecting the second memory die for the first read command; provide the first read enable signal on the second channel while the first memory die is the target of the first read command; and receive the first data strobe signal on the first channel while the first memory die is the target of the first read command.

An embodiment includes a method for operating a memory system. The method comprises determining, by a first memory die, that the first memory die is a target of a first read command from a memory controller. The method further comprises receiving a first read enable signal over a first electrical line connected to a first pad on the first memory die. The first read enable signal being a first control signal from the memory controller to instruct the memory die to transmit data for the first read command. The method further comprises transferring a data strobe signal from the first memory die over a second electrical line connected to a second pad on the memory die. The data strobe signal being a second control signal for data transferred from the first memory die over a data input/output (I/O) channel between the memory die and the memory controller in response to the first read command. The method further comprises determining, by the first memory die, that the first memory die is a non-target of a second read command from the memory controller. The method further comprises sampling the second electrical line for a second read enable signal during an initial phase of the second read command. The second read enable signal being a third control signal from the memory controller to instruct a second memory die to transmit data for the second read command. The method further comprises activating on-die termination (ODT) connected to the second pad to provide termination resistance on the first memory die to the second electrical line responsive to detecting a transition of the second read enable signal to an active state during the initial phase of the second read command.

An embodiment includes a memory system comprising a communication link having a first electrical line and a second electrical line, a first memory die communicatively coupled with the communication link, and a second memory die communicatively coupled with the communication link. The first memory die has a first data strobe pad connected to the first electrical line and a first read enable pad connected to the second electrical line. The first memory die has first on-die termination (ODT) configured to provide termination resistance at an end the first electrical line that connects to the first data strobe pad. The second memory die has a second data strobe pad connected to the second electrical line and a second read enable pad connected to the first electrical line. The second memory die has second on-die termination (ODT) configured to provide termination resistance at an end the second electrical line that connects to the second data strobe pad. The first memory die is configured to enable the first ODT responsive to detection of a transition of a first read enable signal on the first electrical line during an initial phase of a first read command when the second memory die is a target of the first read command and the first memory die is a non-target of the first read command. The second memory die is configured to enable the second ODT responsive to detection of a transition of a second read enable signal on the second electrical line during an initial phase of a second read command when the first memory die is a target of the second read command and the second memory die is a non-target of the second read command.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. An apparatus, comprising:
a communication link having a first channel and a second channel;
a first memory die connected to the communication link, wherein the first memory die is configured to send a first data strobe signal over the first channel and receive a first read enable signal on the second channel when the first memory die is a target die for a first read command; and
a second memory die connected to the communication link, the second memory die having on-die termination (ODT) configured to provide termination resistance to the second channel, wherein the second memory die is configured to send a second data strobe signal over the second channel and receive a second read enable signal on the first channel when the second memory die is a target of a second read command, wherein the second memory die is configured to enable the second ODT responsive to a condition of the first read enable signal on the second channel when the first memory die is a target of the first read command and the second memory die is a non-target of the first read command.

2. The apparatus of claim 1, wherein the condition of the first read enable signal is a transition of the first read enable signal on the second channel during an initial phase of the first read command.

3. The apparatus of claim 2, wherein:
the first read enable signal is active low, the second memory die is configured to detect the first read enable signal transition from high to low as the condition to enable the second ODT.

4. The apparatus of claim 2, wherein:
the first read enable signal is active high, the second memory die is configured to detect the first read enable signal transition from low to high as the condition to enable the second ODT.

5. The apparatus of claim 2, wherein:
the first memory die includes first on-die termination (ODT) configured to provide termination resistance to the first channel, the ODT of the second memory die is second ODT; and
the first memory die is configured to enable the first ODT responsive to detection of a transition of the second read enable signal on the first channel during an initial phase of the second read command when the second memory die is a target of the second read command and the first memory die is a non-target of the second read command.

6. The apparatus of claim 5, wherein:
the first memory die further includes a first edge detection circuit coupled to the first channel, the first edge detection circuit configured to detect an edge of the second read enable signal on the first channel during an initial phase of the second read command when the first memory die is a non-target of the second read command; and
the second memory die further includes a second edge detection circuit coupled to the second channel, the second edge detection circuit configured to detect an edge of the first read enable signal on the second channel during an initial phase of the first read command when the second memory die is a non-target of the first read command.

7. The apparatus of claim 6, wherein:
the first edge detection circuit comprises a first latch configured to detect an edge of the second read enable signal on the first channel; and
the second edge detection circuit comprises a second latch configured to detect an edge of the first read enable signal on the second channel.

8. The apparatus of claim 6, wherein:
the first channel comprises a first differential channel having a first electrical line and a second electrical line, the first edge detection circuit has a first input coupled to the first electrical line of the first channel to sample the second read enable signal when the first memory die is the non-target of the second read command; and
the second channel comprises a second differential channel having a third electrical line and a fourth electrical line, the second edge detection circuit has a first input coupled to the third electrical line of the second channel to sample the first read enable signal when the second memory die is the non-target of the first read command.

9. The apparatus of claim 1, wherein the second memory die is configured to disable the second ODT responsive to a condition of a read enable signal on the second channel when the first memory die is a target of a write command and the second memory die is a non-target of the write command.

10. The apparatus of claim 1, further comprising:
a memory controller communicatively coupled with the first memory die and the second memory die by the communication link, wherein the memory controller is configured to:
select the first memory die as the target for the first read command while not selecting the second memory die for the first read command;
provide the first read enable signal on the second channel while the first memory die is the target of the first read command; and
receive the first data strobe signal on the first channel while the first memory die is the target of the first read command.

11. A method for operating a memory system, the method comprising:
determining, by a first memory die, that the first memory die is a target of a first read command from a memory controller;
receiving a first read enable signal over a first electrical line connected to a first pad on the first memory die, the first read enable signal being a first control signal from the memory controller to instruct the first memory die to transmit data for the first read command;
transferring a data strobe signal from the first memory die over a second electrical line connected to a second pad on the first memory die, the data strobe signal being a second control signal for data transferred from the first memory die over a data input/output (I/O) channel between the first memory die and the memory controller in response to the first read command;
determining, by the first memory die, that the first memory die is a non-target of a second read command from the memory controller;
sampling the second electrical line for a second read enable signal during an initial phase of the second read command, the second read enable signal being a third control signal from the memory controller to instruct a second memory die to transmit data for the second read command; and
activating on-die termination (ODT) connected to the second pad to provide termination resistance on the first memory die to the second electrical line responsive to detecting a transition of the second read enable signal to an active state during the initial phase of the second read command.

12. The method of claim 11, wherein detecting the transition of the second read enable signal comprises:
detecting a transition of the second read enable signal from a high state to a low state during the initial phase of the second read command.

13. The method of claim 11, wherein detecting the transition of the second read enable signal comprises:
detecting a transition of the second read enable signal from a low state to a high state during the initial phase of the second read command.

14. The method of claim 11, further comprising:
determining, by the first memory die, that the first memory die is a non-target of a write command;
sampling the second electrical line for a third read enable signal during an initial phase of the write command; and
de-activating the on-die termination (ODT) connected to the second pad responsive to detecting no transition of the third read enable signal during the initial phase of the write command.

15. A memory system comprising:
a communication link having a first electrical line and a second electrical line;
a first memory die communicatively coupled with the communication link, the first memory die having a first data strobe pad connected to the first electrical line and a first read enable pad connected to the second electrical line, the first memory die having first on-die termination (ODT) configured to provide termination resistance at an end the first electrical line that connects to the first data strobe pad; and
a second memory die communicatively coupled with the communication link, the second memory die having a second data strobe pad connected to the second electrical line and a second read enable pad connected to the first electrical line, the second memory die having second on-die termination (ODT) configured to provide termination resistance at an end the second electrical line that connects to the second data strobe pad;
wherein the first memory die is configured to enable the first ODT responsive to detection of a transition of a first read enable signal on the first electrical line during an initial phase of a first read command when the second memory die is a target of the first read command and the first memory die is a non-target of the first read command; and
wherein the second memory die is configured to enable the second ODT responsive to detection of a transition of a second read enable signal on the second electrical line during an initial phase of a second read command when the first memory die is a target of the second read command and the second memory die is a non-target of the second read command.

16. The memory system of claim 15, wherein:
the first memory die further includes a first edge detection circuit coupled to the first electrical line, the first edge detection circuit configured to detect a falling edge of the second read enable signal on the first electrical line when the first memory die is the non-target of the second read command; and
the second memory die further includes a second edge detection circuit coupled to the second electrical line, the second edge detection circuit configured to detect a falling edge of the first read enable signal on second first electrical line when the second memory die is the non-target of the first read command.

17. The memory system of claim 15, wherein:
the first memory die further includes a first edge detection circuit coupled to the first electrical line, the first edge detection circuit configured to detect a rising edge of the second read enable signal on the first electrical line when the first memory die is the non-target of the second read command; and
the second memory die further includes a second edge detection circuit coupled to the second electrical line, the second edge detection circuit configured to detect a rising edge of the first read enable signal on second first electrical line when the second memory die is the non-target of the first read command.

18. The memory system of claim 15, further comprising a memory controller communicatively coupled with the first memory die and the second memory die by the communication link, wherein the memory controller is configured to:
- select the second memory die as the target for the first read command while not selecting the first memory die for the first read command; and
- provide the first read enable signal on the first electrical line while the second memory die is the target of the first read command.

19. The memory system of claim 18, wherein:
the second memory die is further configured to send a data strobe signal to the memory controller on the second electrical line responsive to transitions of the first read enable signal on the first electrical line during the first read command.

20. The memory system of claim 15, wherein:
the first memory die is configured to disable the first ODT responsive to no transition of a third read enable signal on the first electrical line during an initial phase of a first write command when the second memory die is a target of the first write command and the first memory die is a non-target of the first write command; and
the second memory die is configured to disable the second ODT responsive to no transition of a fourth read enable signal on the second electrical line during an initial phase of a second write command when the first memory die is a target of the second write command and the second memory die is a non-target of the second write command.

* * * * *